United States Patent
Kitai et al.

[11] 3,846,815
[45] Nov. 5, 1974

[54] POWER SWITCH CONTROL IN ELECTRIC SHUTTER

[75] Inventors: Kiyoshi Kitai, Tokyo; Yukio Nakamura, Chiba; Hiroaki Ishida, Chiba; Shinji Nagaoka, Chiba, all of Japan

[73] Assignee: Seiko Koki Kabushiki Kaisha, Tokyo, Japan

[22] Filed: Jan. 28, 1974

[21] Appl. No.: 437,182

[52] U.S. Cl. .................... 354/234, 354/50, 354/267
[51] Int. Cl. ............................................. G03b 9/08
[58] Field of Search ........... 354/29, 30, 50, 51, 234, 354/235, 258, 266, 267

[56] References Cited
UNITED STATES PATENTS

| | | | |
|---|---|---|---|
| 3,425,328 | 2/1969 | Ichijo et al. | 354/50 |
| 3,507,201 | 4/1970 | Fahlenberg et al. | 354/267 |
| 3,698,304 | 10/1972 | Tenhung | 354/234 |
| 3,714,880 | 2/1973 | Kitai | 354/258 |
| 3,722,391 | 3/1973 | Kitai | 354/51 X |
| 3,722,392 | 3/1973 | Kitai | 354/50 |

*Primary Examiner*—Joseph F. Peters, Jr.
*Attorney, Agent, or Firm*—Robert E. Burns; Emmanuel J. Lobato; Bruce L. Adams

[57] ABSTRACT

An electric shutter in which an electromagnet in an exposure control circuit for controlling allowing of the closing of the shutter is energized through a power switch that is operated to a closed position by a switch lever and to an open position by a switch interlocking lever which restores the switch lever and is coaxial therewith. These two levers are actuated by a common travelling member that is set in motion before the shutter blades open for closing the power switch and energizing the electromagnet and before the shutter blades close to open the power switch. The travelling member is under control of the mechanism for opening and closing the shutter.

2 Claims, 4 Drawing Figures

POWER SWITCH CONTROL IN ELECTRIC SHUTTER

BACKGROUND OF THE INVENTION

This invention relates generally to cameras and more particularly to a new and improved electric shutter.

In cameras where an exposure time control circuit has an electromagnet that is energized to attract an armature during the exposure and is de-energized to terminate the exposure two parallel switches may be employed and are operated by the shutter release and by some other part of the shutter mechanism. This generally results in a complex arrangement and the reliability of the operation of the switches is always a problem.

SUMMARY OF THE INVENTION

It is a principal object of the present invention to provide a camera shutter mechanism in which the application of power to an electromagnet of the exposure time control circuit in order to avoid premature exposure and a proper timed exposure is controlled to avoid these defects.

The electric shutter comprises a plurality of shutter blades operable from a closed position to an open position and back to the closed position. Mechanism for opening and closing the shutter blades is provided. An exposure time control circuit controls closing of the shutter blades and has an electromagnet that is energized to hold the shutter mechanism in a shutter-opening position and when de-energized allows closing of the shutter blades. A power switch operable to an open and a closed position places a power source in circuit for energizing the elctromagnet. A switch lever operates the power switch to the closed position and an interlocking lever engaged with the switch lever and coaxial therewith operates the switch to an open position and returns the lever to a position for readiness for closing of the power switch. A travelling member comprising a setting lever is actuated by the mechanism opening and closing the shutter blades for travelling ahead of the opening of the shutter blades to actuate the power switch to the closed position to energize the electromagnet and travels ahead of the closing of the shutter blades to actuate the interlocking lever to open the power switch.

BRIEF DESCRIPTION OF THE DRAWINGS

Other objects and advantages will appear from the following description of an example of an electric shutter according to the invention, and the novel features will be particularly pointed out in the appended claims and drawings in which:

DESCRIPTION OF THE PREFERRED EMBODIMENTS

Figure 1:
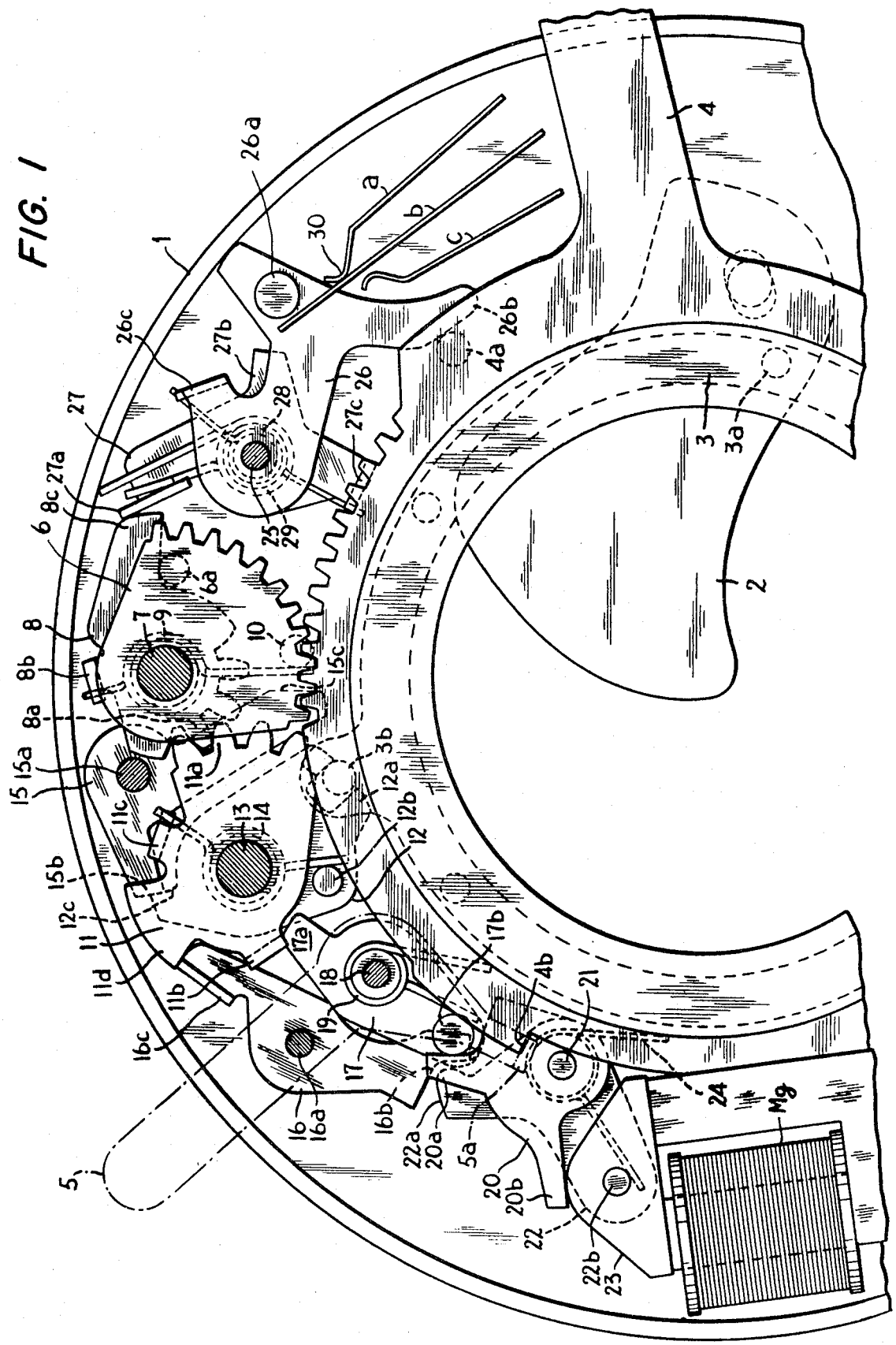
FIG. 1 is a fragmentary plan view of an electric shutter according to the invention illustrating the shutter in a cocked condition.

As can be seen in the drawing a shutter case 1 has therein a shutter blade operating ring 3 for operating a plurality of shutter blades 2 pivotally mounted, only one of which is shown. The shutter blade-operating ring is provided with blade pins 3a and a ring-operating pin 3b. A set or setting lever 4 has an arm extending outwardly of the shutter case and switch pin 4a and a shoulder 4b engaging a release lever 5 having an arm extending outwardly of the shutter case 1. The release lever 5 has a tab 5a, normal to the plane of the drawing, to releasably lock the setting lever 4.

A setting gear 6 is pivoted on a pivot 7. A shutter-closing lever 8 is pivoted on the same pivot 7 and is biased by a shutter-closing spring 9 having one end held by a fixed pin 10. The shutter-closing lever has a gear portion 8a meshing with with a gear portion 11a of a main driving lever 11 and has a hook 8b holding its biasing spring and an arm 8c. The main driving lever 11 has two upstanding tabs 11b, 11c normal to the plane of the drawing and a projection 11d. A main driving cam 12 is mounted coaxially with the main driving lever 11 on a pivot 13 and has a fork 12 in which the ring-operating pin 3b is received for being actuated thereby. The main driving cam 12 has a pin 12b and a projection 12c. A main driving spring 14 is disposed about the pivot 13 and has one end bearing against the main driving pin 12b and another end bearing against the upstanding tab 11c of the main driving lever 11.

A main driving cam claw 15 is pivoted on a pivot 15a and has two arms 15b, 15c and has imparted thereto a counterclockwise biasing force by a spring, not shown. A main driving lever claw 16 is pivoted on a pivot 16a and has an arm 16b and a tab or upstanding bent part 16c normal to the plane of the drawing. The main driving lever claw has imparted thereto a clockwise biasing force by a spring, not shown. An intermediate lever 17 is pivoted on a pivot 18 and has an arm 17a and an intermediate lever pin 17b. A holding spring 19 has one end against the intermediate lever pin 17b. A holding lever 20 is pivoted on a pivot 21 and has two arms 20a, 20b.

An armature lever 22 has an arm 22a and is pivoted on the pivot 21 through a pin 22b connection to an armature 23. The armature lever 22 is biased in a clockwise direction by a biasing spring 24. The armature is biased against an electromagnet Mg and is attracted by the electromagnet Mg when energized as later explained.

A switch lever 26 is pivoted on a pivot 25 and transports an insulative switch pin 26a and has an arm 26b cooperative with setting lever pin 4a. The switch lever has an upstanding projection or tab 26c normal to the plane of the drawing. An interlocking lever 27 is mounted coaxially with the switch lever on its pivot 25 and it too has an upstanding projection 27a, an arm 27b and a second arm with an upstanding projection 27c. A switch lever spring 28 is held at one end by the upstanding projection 26c of the switch lever and at the other end by the upstanding projection 27c of the interlocking lever 27. An interlocking lever spring 29 has one end held by the upstanding projection 27a of the interlocking lever and its other end is held by the shutter case 1.

Figure 4:
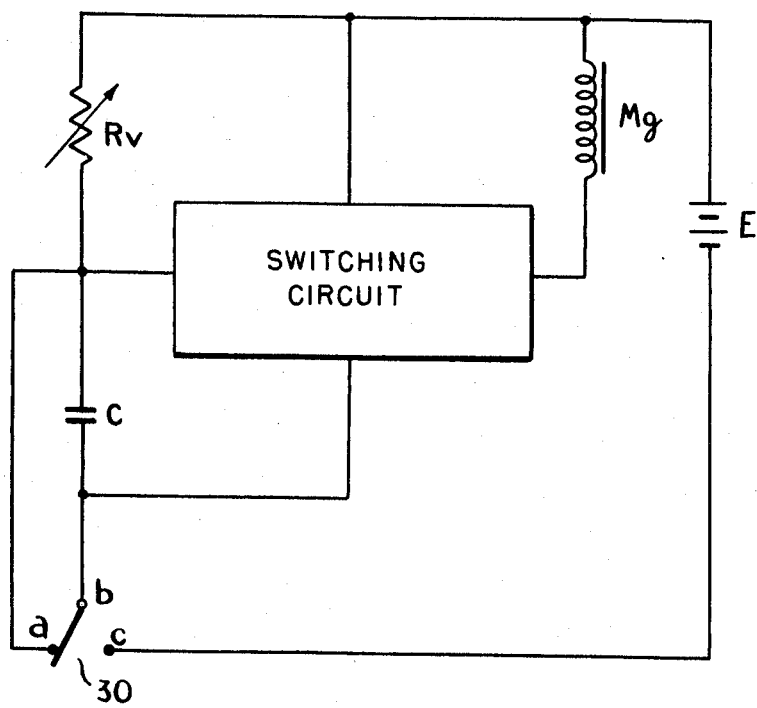
FIG. 4 is a schematic of an exposure time control circuit for the electric shutter in FIG. 1.

An exposure time control circuit is provided as shown in FIG. 4 and has a control switch 30 having a first fixed contact $a$, a movable contact $b$ and a second fixed contact $c$ connected to a power source E. The movable contact is connected to the first fixed contact $a$ when the shutter is in a cocked condition, which is the condition of the shutter in FIG. 1, and is connected to a capacitor C and a variable resistor $R_v$ in series connected across the power source E for use in selecting a variable exposure time. The first fixed contact $a$ is connected to a junction between the variable resistor and the capacitor to which is connected to a switching circuit and the electromagnet as shown.

OPERATION

In order to take an exposure with the shutter cocked or set, the condition shown in FIG. 1, the release lever 5 is actuated in a clockwise direction. The shoulder 4b is released by the upstanding stop projection 5a and the setting lever 4 is set free from a locked state and it starts turning in a counterclockwise direction. The switch pin 4a of the setting lever is disengaged from the arm 26b of the switch lever 26. The switch lever 26 is rotated clockwise by the switch lever spring 28. The movable contact $b$ of the control switch 30 is separated from the first fixed contact $a$ by means of the switch pin 26a and engaged with the second fixed contact $c$ to place the power source E in circuit and simultaneously begin the charging of the capacitor C.

As the setting lever is rotated in a counterclockwise direction the setting gear 6 is rotated in a clockwise direction. The setting gear teeth mesh with peripheral teeth on the setting lever 4. The setting pin 6a pushes the arm 15c of the main driving cam claw 15 and turns it clockwise thus disengaging its arm 15b and the projection 12c of the main driving cam 12 with which it is engaged.

Figure 2:
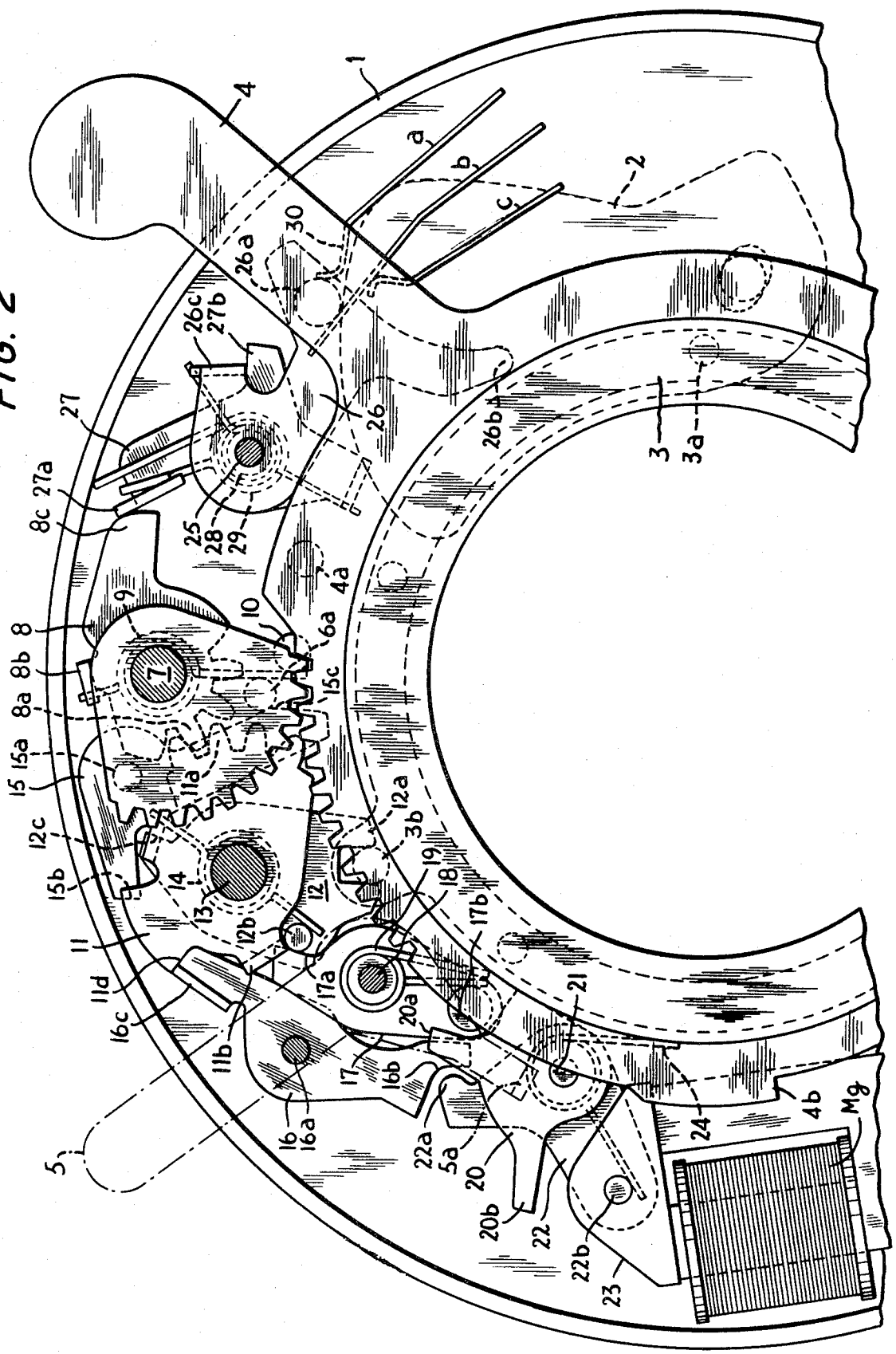
FIG. 2 is a fragmentary plan view of the electric shutter in FIG. 1 illustrating it in an open condition.

The main driving cam 12 being released from a locked position by the main driving claw 15 rotates or turns quickly in a clockwise direction by means of the main driving spring 14. As it turns it drives the ring-operating pin 3b and the shutter blade-operating ring 3 is turned in a counterclockwise direction thereby opening the shutter blades 2. At the same time the pin 12b on the main driving cam 12 engages the arm 17a of the intermediate lever 17 and pushes it to turn it in a counterclockwise direction against the holding spring 19 releasing or relieving a pressure force applied to the armature 23 applying it against the electromagnet. This force is applied through the intermediate lever pin 17b, the arm 20a of the holding lever 20 and its other arm 20b which bears against the armature. Since the control circuit is energized and the electromagnet is energized the armature 23 is being attracted and is held in position. The main driving cam pin 12b then strikes the upstanding projection 11b of the main driving lever 11 by which the rotating force of the main driving spring is cancelled. The shutter is illustrated in this state in FIG. 2.

When this state is reached the power of the spring for opening the shutter blades has been expended and the power or force for closing the shutter blades is stored in the shutter closing spring 9. This force is transmitted to the main driving lever 11 through the gear teeth 8a of the closing lever 8 and the gear teeth of the main driving lever 11 and the projection 11d of the main driving lever 11 is locked by the upstanding projection 16c of the main driving lever claw 16. The pressure or force applied to the armature biasing it to the electromagnet is released. When the electromagnet is deenergized by the control circuit after the lapse of the exposure time, determined by the variable resistor and the capacitor, the attraction of the armature is terminated and it is released. The armature lever 22 is rotated in a clockwise direction by the control lever spring 24. The arm 22a presses the arm 16b of the main driving lever claw 16 causing it to turn in a counterclockwise direction thus releasing the upstanding projection 16c from locking the main driving lever. The main driving lever 11 being unlocked and free to move joins together with the main driving cam 12 and turns in a counterclockwise direction by the motive power of the shutter-closing spring 9. Accordingly the ring-operating pin 3b engaged with the fork 12a of the main driving cam is actuated in a clockwise direction and the shutter blades are closed.

Since the main driving cam pin 12b is then released from locking with the intermediate lever 17 the intermediate lever 17 turns in a clockwise direction under the spring biasing the armature toward the electromagnet Mg through the intermediate lever pin 17b and the holding lever 20. Meanwhile the closing lever 8 which has gear teeth meshing with teeth of the main driving lever 11 turns in a clockwise direction and its arm 8c is released from locking with the upstanding projection 27a of the switch interlocking lever 27 and rotates and stops when it strikes the fixed pin 10. The switch interlocking lever 27 being set free from locking with the closing lever 8 turns in a counterclockwise direction by action of the spring 29 and its arm 27b engages the bent projection 26c of the switch lever 26 and causes it to turn in a counterclockwise direction thereby allowing the center contact $b$ to return to the position shown in FIG. 3 which is the condition of the shutter when the taking of an exposure has been completed.

Figure 3:
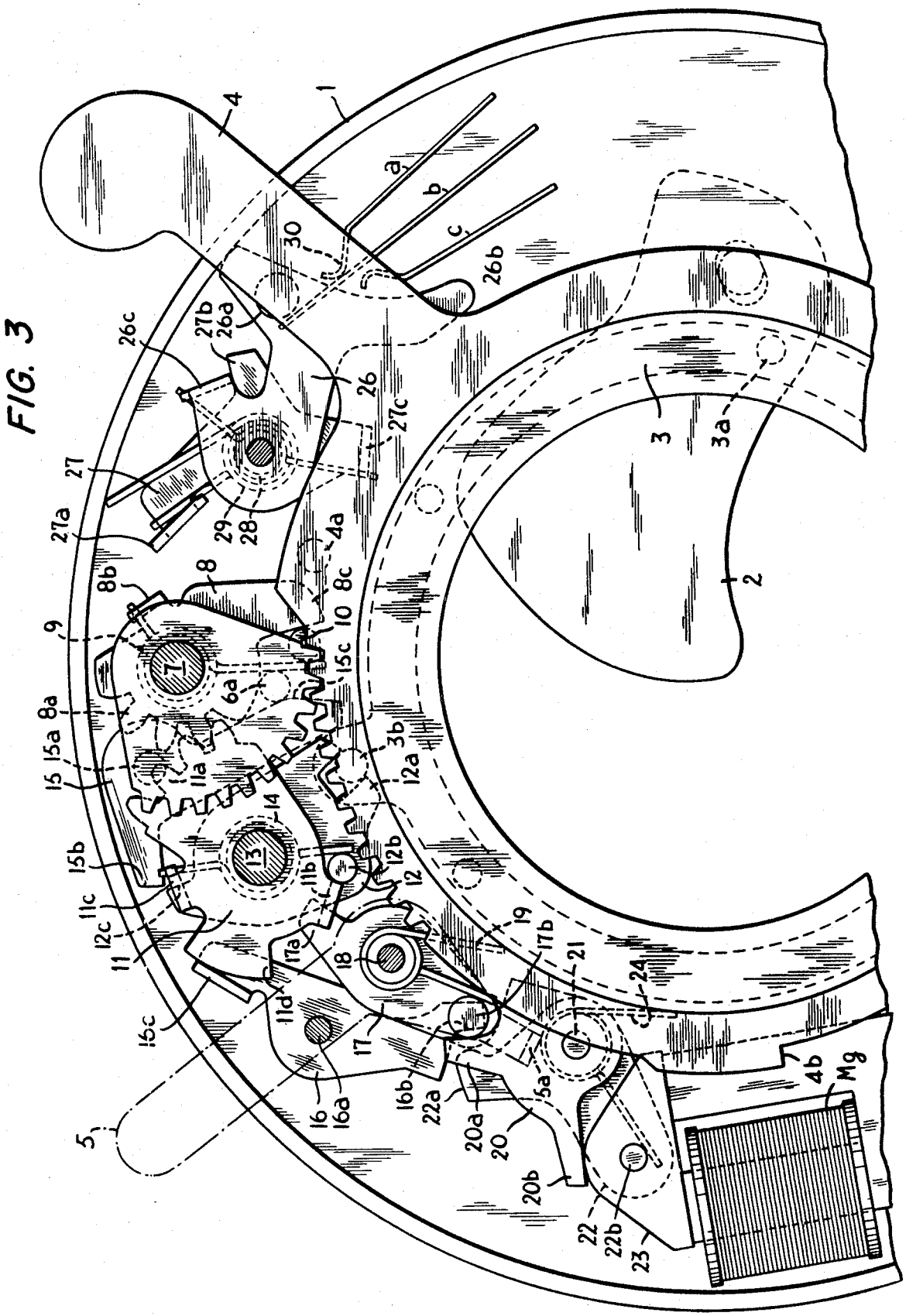
FIG. 3 is a fragmentary plan view of the electric shutter in FIG. 1 illustrating it in a condition after taking of an exposure has been completed.

To set or cock the shutter the setting lever 4 is moved from the position in FIG. 3 in a clockwise direction. The setting gear is simultaneously turned in a counterclockwise direction. First the setting pin 6a separates from engagement with the main driving cam claw 15 and the main driving cam claw 15 has its arm 15b face the protruding part or projection 12c of the main driving cam 12. As the setting gear 6 rotates the setting pin 6a engages with the arm 8a of the closing lever 8 and causes it to turn in a counterclockwise direction. At the same time the main driving lever 11 connected by gear teeth with the closing lever 8 also starts to rotate in a clockwise direction and the main driving cam 12 connected by the main driving spring 14 begins turning in a clockwise direction as well. When the main driving cam 12 has turned a little its projection 12c engages the arm 15b of the main driving cam claw 15 which hinders or restricts its rotation and only the main driving lever 11 turns in connection with the shutter closing lever 8. The main driving spring 14 and the closing spring 9 are set.

Toward the end of rotation of the setting gear 6 the upstanding projection 16c of the main driving lever claw 16 engages the projection 11d of the main driving lever 11 where it is locked. The arm 8c of the closing lever 8 locks with the upstanding projection toward the end of its rotation and turns it from the position shown in FIG. 3 to that shown in FIG. 1. Since the switch pin 4a of the set or setting lever 4 is already at a position where it may become engaged with the arm 26b of the switch lever 26 the switch lever 26 remains at the position shown in FIG. 3 and springs 28, 29 are set. The setting lever 4 is locked or stopped when the upstanding projection 5a of the release lever is engaged with the part 4b of the setting lever. Thus the shutter setting or charging is completed.

What we claim and desire to secure by Letters Patent:

1. An electric shutter comprising, a plurality of shutter blades operable from a closed position to an open position and back to the closed position, means for opening and closing the shutter blades, an exposure time control circuit for controlling closing of the shutter blades having a power source, an electromagnet and a power switch operable to a closed position for placing the power source in circuit for energizing the electromagnet and an open position, means to de-energize the electromagnet when an exposure time terminates, a switch lever for operating the power switch to said closed position, a switch interlocking lever engaged with the switch lever and coaxial therewith for operating the switch to an open position and returning the switch lever to a position of readiness for closing the power switch, and travelling means controlled by said means to open and close the shutter blades travelling ahead of the opening of the shutter blades to actuate said switch lever to said closed position to energize said electromagnet and travelling ahead of the closing of the shutter blades to actuate said switch interlocking lever to open said power switch.

2. An electric shutter according to claim 1, in which said travelling means comprises a setting lever.

* * * * *